Jan. 29, 1952 W. A. KEETCH 2,583,948
RESILIENT MOUNTING
Filed Nov. 26, 1948 4 Sheets-Sheet 2

Inventor
William A. Keetch
By Ralph Hammar
Attorney

Jan. 29, 1952     W. A. KEETCH     2,583,948
RESILIENT MOUNTING

Filed Nov. 26, 1948     4 Sheets-Sheet 3

Inventor
William A. Keetch
Ralph Hammar
Attorney

Jan. 29, 1952 W. A. KEETCH 2,583,948
RESILIENT MOUNTING
Filed Nov. 26, 1948 4 Sheets-Sheet 4

Inventor
William A. Keetch
Ralph Hammar
Attorney

Patented Jan. 29, 1952

2,583,948

UNITED STATES PATENT OFFICE 2,583,948

RESILIENT MOUNTING

William A. Keetch, Erie, Pa., assignor to Lord Manufacturing Company, Erie, Pa., a corporation of Pennsylvania Application November 26, 1948, Serial No. 61,968

8 Claims. (Cl. 248—5)

Mounting systems have been proposed using hinged links having different stiffness along and transverse to the length of the links for projecting the elastic center of a supported body to axes remote from the attaching points on a supported member. This invention is intended to improve the link type mounting system by a construction utilizing rubber sandwich mountings transverse to the link. In one form, the sandwich mountings are arranged on opposite sides of an annular member having trunnion bearings at its edges and the connection to the link is made through a stem extending through the annular member and fixed to the sandwich mountings at points spaced from the annular member. Among the advantages obtainable are uniform loading of the rubber, equal stiffness in both directions along the length of the link, and controlled snubbing in all directions. Further objects and advantages appear in the specification and claims.

Figure 1:
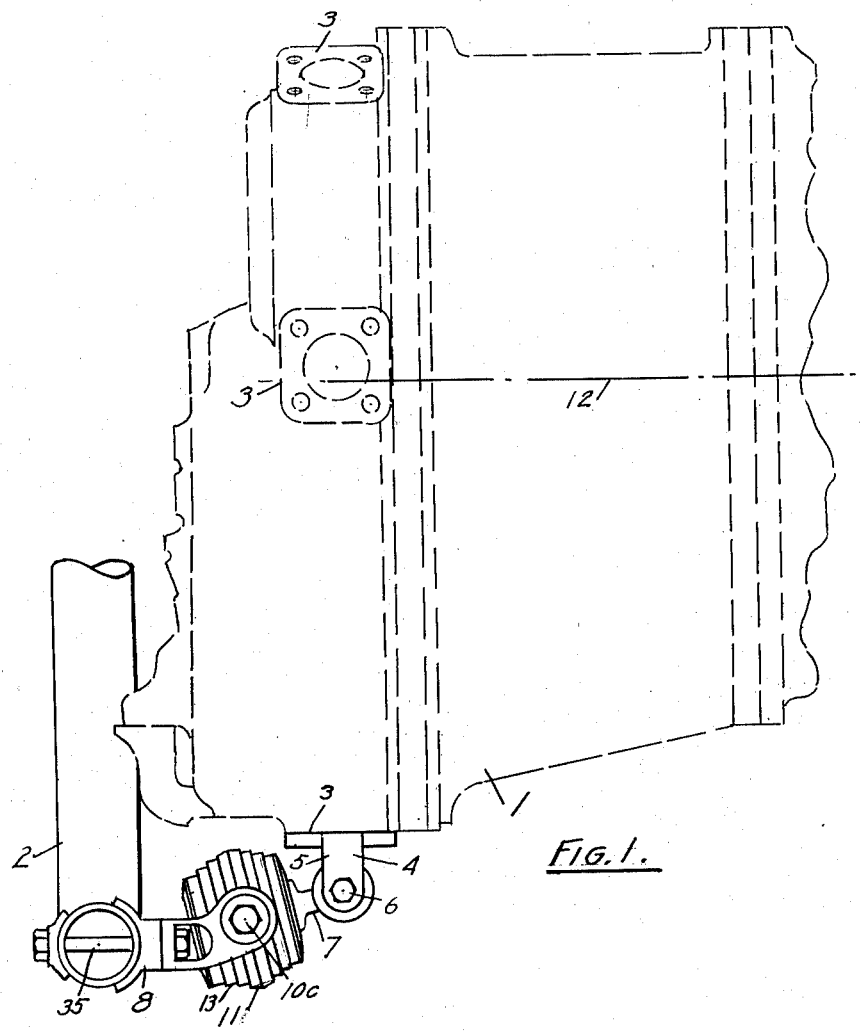
Figure 2:
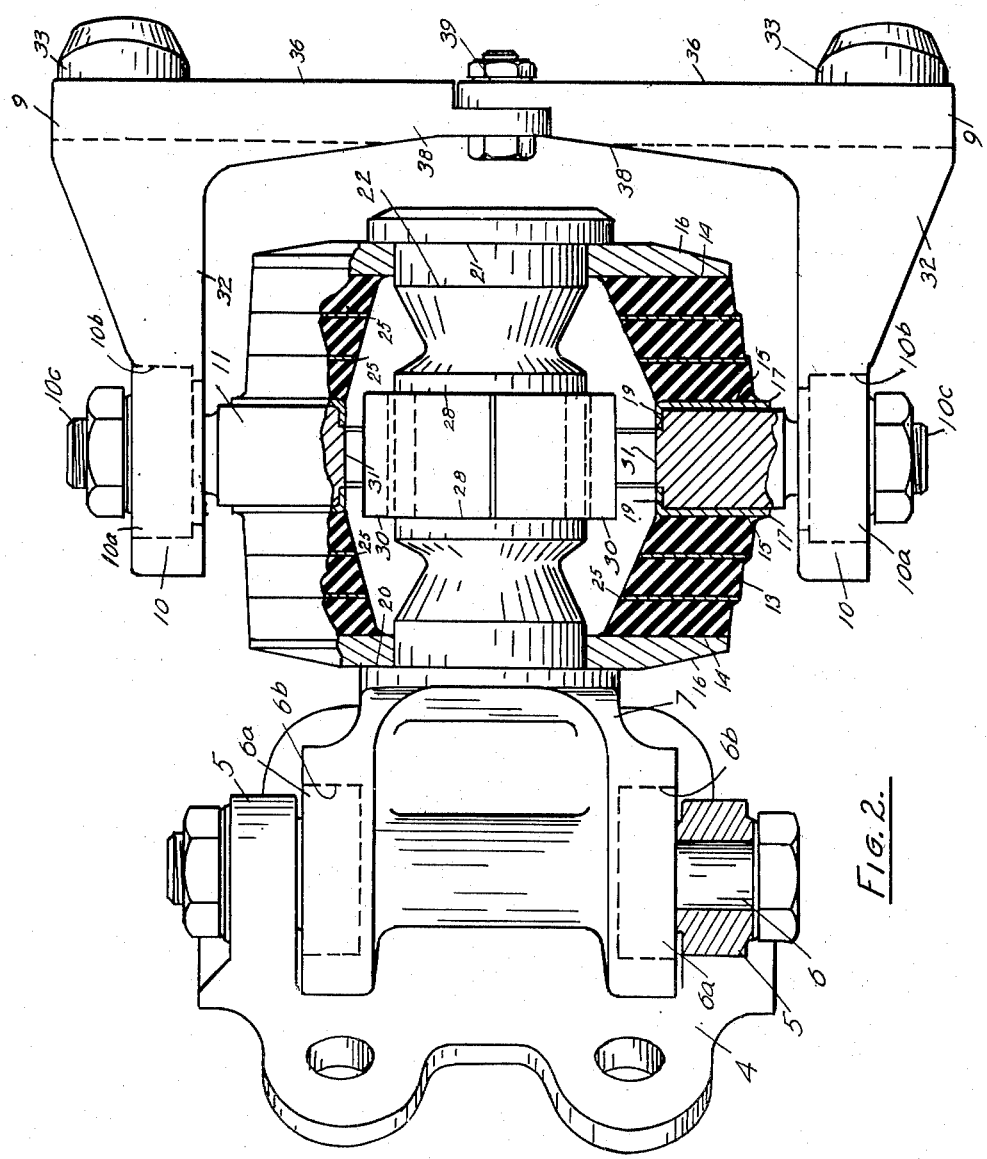
Figure 3:
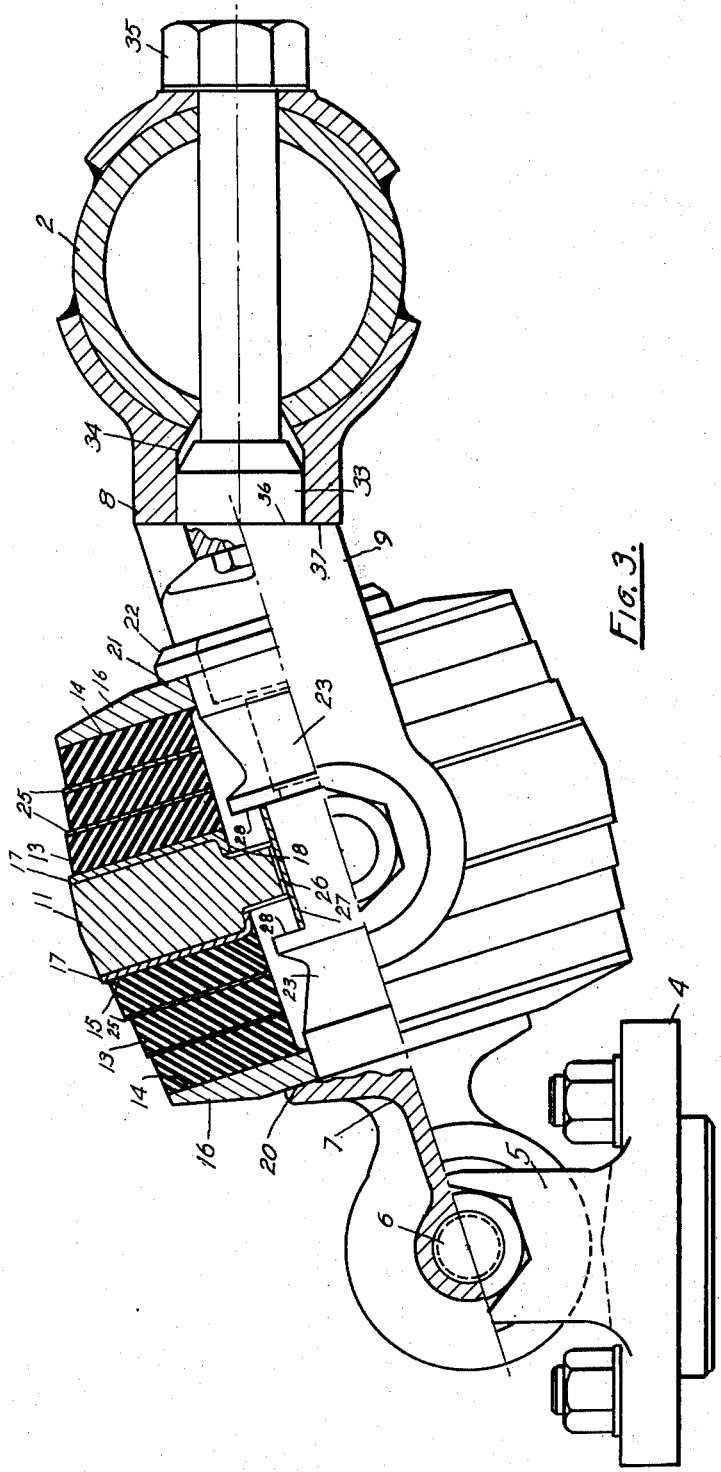
Figure 4:
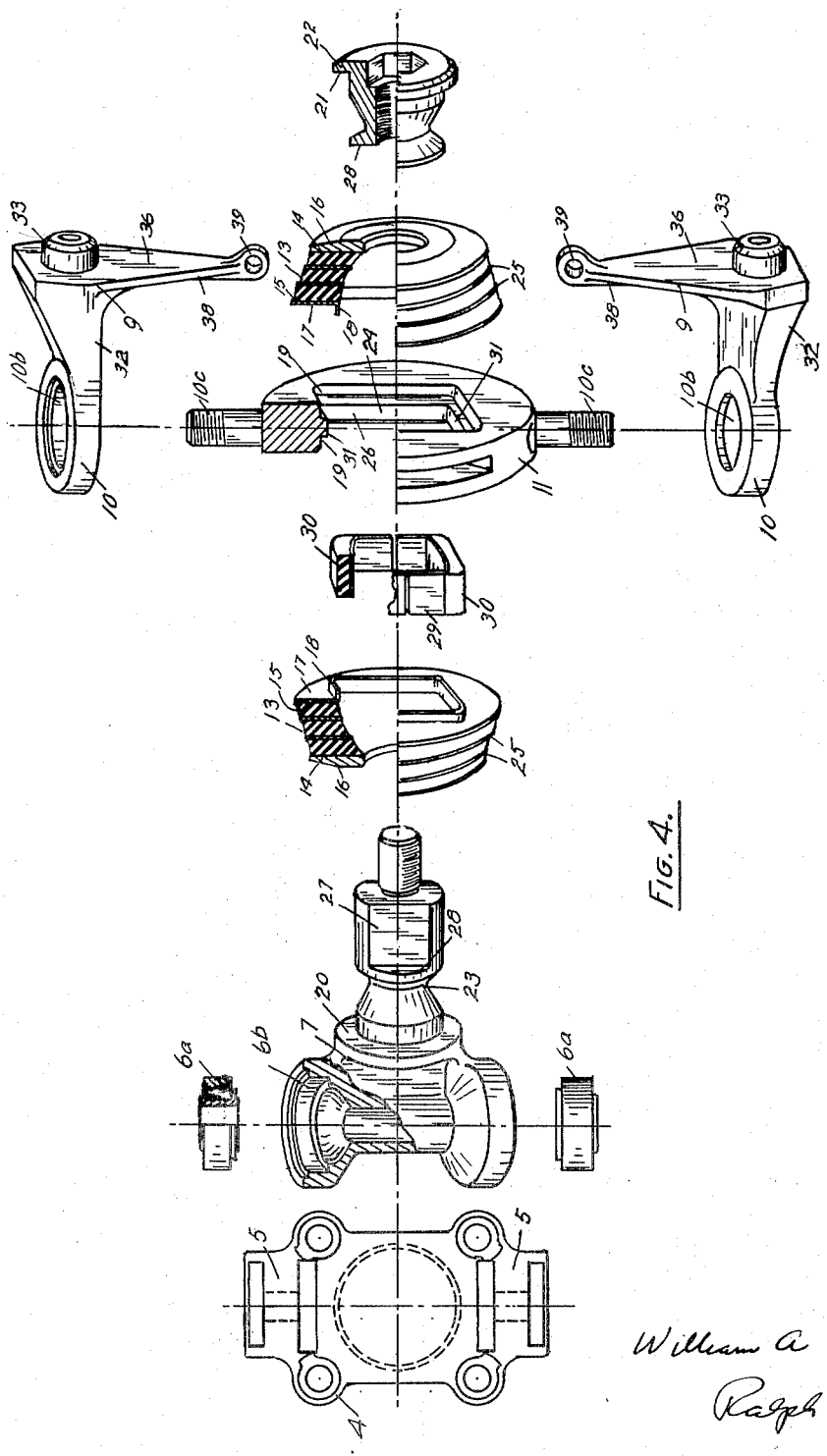

In the drawing, Fig. 1 is a side elevation of a mounting for a gear box forming a speed reducing connection between an aircraft engine and propeller (not shown); Fig. 2 is an enlarged section through one of the mounting links; Fig. 3 is a side elevation, partly broken away, of one of the mounting links; and Fig. 4 is an exploded view of one of the mounting links.

In the drawing, the mountings are shown supporting a gear box 1 forming a speed reducing connection between an aircraft engine and propeller (not shown) carried by a mounting ring 2 surrounding the torque axis of the gear box and rearward of the center of gravity so that the gear box is supported and in overhung relation to the mounting ring. The gear box has the same vibration problems as a radial aircraft engine supported in overhung relation to the engine ring and the mountings for gear boxes and for aircraft engines are interchangeable. The gear box has a series of mounting pads 3 to which are fixed brackets 4 having spaced ears 5 carrying a hinge pin 6 at one end of a link 7. The link is journaled on the hinged pin by anti-friction bearings 6a carried in oppositely facing sockets 6b. The mounting ring has a series of pads 8 to which are bolted brackets 9 having trunnion bearing connections 10 to opposite edges of an annular plate 11 transverse to the longitudinal axis of the link 7. The trunnion bearings 10 comprise anti-friction bearings 10a seated in oppositely facing sockets 10b and cooperating with studs 10c integral with edges of the plate 11. The arrangement of the pads 3 and 8 is such that the links converge toward the torque axis 12 of the gear box providing a virtual support in the region of the center of gravity.

In mounting systems of this type it is desirable that the stiffness of the link along its longitudinal axis be materially greater than the stiffness along a cross axis. In the present construction this stiffness ratio is obtained by sandwich mountings having annular bodies 13 of rubber or equivalent resilient material sandwiched between and bonded to the opposing faces 14, 15 of spaced metal plates 16, 17. The metal plates 17 have inturned flanges 18 seated in recesses 19 on opposite sides of the annular plate 11. The plates 16 are seated on the link 7 and are clamped between a shoulder 20 on the link and a shoulder 21 on a nut 22 threaded on the end of the link. In the assembled position the link 7, in effect, has a stem 23 extending through an opening 24 at the center of the annular plate 11 and spaced from the side walls of the annular rubber bodies 13 so that upon relative motion of the annular plate 11 transverse to the axis of the link, the rubber is free to yield in shear. Upon motion of the plate 11 along the axis of the link the rubber is stressed in direct stress (compression or tension). The stiffness along the axis of the link is controlled by plates 25 embedded in the rubber parallel to the plates 16 and 17 which restrict bulging of the rubber under direct stress. Because the rubber bodies 13 are symmetrical the stiffness along the longitudinal axis of the link is the same in both directions. This result would not be obtained if the rubber on one side of the annular plate 11 were shaped differently from the rubber on the other side of the plate.

In the particular construction illustrated where the axis of the trunnion bearing 10 is parallel to the axis of the hinge pin 6 and both axis are on the longitudinal axis of the link 7, there is no cocking or tilting action in the rubber. Forces along the axis of the hinge pin 6 stress the rubber uniformly in shear parallel to the opposing faces 14 and 15 of the metal plates 16 and 17. Due to the absence of cocking or tilting the shear stress is uniform throughout the rubber. Couples about the axis of the hinge pin 6 cause a bodily swinging movement of the link with no stress in the rubber except that due to the negligible bearing friction. Since all force transverse to the longitudinal axis of the link can be resolved into forces acting along and couples about the axis of the hinge pin 6, it is apparent that no force transverse to the axis of the link can cause non-uniform loading of the rubber. If the trunnion bearing 10 were located to one side of the longitudinal axis of the link or if either swinging connection of the link permitted swinging in more than one direction, there would be a cocking or tilting action which would result in non-uniform loading of the rubber, which in some cases might not be objectionable so long as the safe loading of the rubber was not exceeded.

Because there is substantially no loading of the rubber by transverse forces causing swinging of the link in the trunnion bearing 10, the annular plate 11 has an elongated center opening 24 having parallel sides 26 at right angles to the trunnion axis and slightly spaced from flats 27 on the stem 23. At each end of the flats 27 is a shoulder 28 which cooperates with the plate 11 to positively limit movement along the axis of the link. Surrounding the stem 23 between the shoulders 28 is an elongated snubbing ring 29 having rubber 30 bonded to its ends and cooperating with the end surfaces 31 of the opening 24 to yieldably snub movement along the axis of the trunnion bearing 10. In Fig. 2 the mounting is shown in the unloaded position. Under load the rubber bumpers 30 would normally be midway between the end surfaces 31 so that the bumpers would be equally effective to snub extreme movement in either direction along the trunnion axis.

The brackets 9 are made in two pieces, each comprising an arm 32 having at one end one of the trunnion bearings 10a, and at the other end a boss 33 fitting in a socket 34 in the pad 8. The connection to the mounting ring is made by a bolt 35 threaded into the boss 33. When the bolts are tightened surfaces 36 on the bracket 9 are brought into engagement with mating surfaces 37 on the pad 8, providing a stable connection. The arms 32 have extensions 38 which are bolted together at 39 making the pairs of arms of the brackets function as a unitary construction. There is sufficient clearance in the bolted connection 39 to accommodate variations in the location of the recesses 34. The split bracket construction described is also advantageous in facilitating assembly and disassembly of the mountings.

What I claim as new is:

1. In a resilient mounting, an annulus having trunnions at opposite edges, a pair of sandwich mountings respectively on opposite faces of the annulus each comprising an end plate and resilient material such as rubber between the end plate and the adjacent face of the annulus, and a stem extending through the annulus and fixed to the end plates.

2. In a resilient mounting, an annulus having trunnions at opposite edges, a pair of sandwich mountings respectively on opposite faces of the annulus each comprising an end plate and resilient material such as rubber between the end plate and the adjacent face of the annulus, a stem extending through the annulus and fixed to the end plates, and a sleeve of resilient material on the stem cooperating with the annulus to limit movement of the stem toward the annulus.

3. In a resilient mounting, a pair of brackets for connection to supporting and supported members, an annulus carried in one bracket by trunnions at opposite edges of the annulus, a stem hinged to the other bracket and extending through the annulus, and a pair of sandwich mountings on opposite faces of the annulus and surrounding the stem, each sandwich mounting having an end plate fixed to the stem and resilient material such as rubber between the end plate and the adjacent face of the annulus.

4. In a resilient mounting, a pair of brackets for connection to supporting and supported members, an annulus carried in one bracket by trunnions at opposite edges of the annulus, a stem hinged to the other bracket and extending through the annulus, a pair of sandwich mountings on opposite faces of the annulus and surrounding the stem, each sandwich mounting having an end plate fixed to the stem and resilient material such as rubber between the end plate and the adjacent face of the annulus, and a sleeve of resilient material on the stem cooperating with the annulus to limit movement of the stem toward the annulus.

5. In an overhung suspension for engines or the like comprising links spaced around the torque axis and converging toward each other, a pair of brackets for connection respectively to the engine and its support, a link comprising an annulus generally tangent to a sphere centered on the torque axis and hinged in one bracket by trunnions at opposite edges of the annulus, a stem hinged in the other bracket and extending through the annulus, and a pair of sandwich mountings on opposite faces of the annulus and surrounding the stem, each sandwich mounting having an end plate fixed to the stem and resilient material such as rubber between the end plate and the adjacent face of the annulus.

6. In a resilient mounting, supporting and supported members, an annulus hinged to one member, a stem hinged to the other member and extending through the annulus, and a pair of sandwich mountings on opposite faces of the annulus and surrounding the stem, each sandwich mounting having an end plate fixed to the stem and resilient material such as rubber between the end plate and the adjacent face of the annulus.

7. In a resilient mounting, supporting and supported members, an annulus hinged to one member for swinging movement on a fixed axis, a stem hinged to the other member for swinging movement on an axis parallel to said fixed axis and extending through the annulus, and a pair of sandwich mountings on opposite faces of the annulus and surrounding the stem, each sandwich mounting having an end plate fixed to the stem and resilient material such as rubber between the end plate and the adjacent face of the annulus.

8. In a mounting, a split trunnion bracket having a pair of arms, each having at one end one of a pair of trunnion bearings and at the other end a boss for attachment to a pad, and a bridging extension on one of the arms connected to the other arm to secure the arms together as a unitary trunnion bracket.

WILLIAM A. KEETCH.

REFERENCES CITED

The following references are of record in the file of this patent:

UNITED STATES PATENTS

| Number | Name | Date |
|---|---|---|
| 2,175,999 | Taylor | Oct. 10, 1939 |
| 2,477,972 | Effromson et al. | Aug. 2, 1949 |